United States Patent Office 3,814,763
Patented June 4, 1974

3,814,763
PROCESS FOR MAKING OROTIC ACID
Karl-Josef Boosen, La Neuveville, Bern, Switzerland, assignor to Lonza Ltd., Gampel, Valais, Basel, Switzerland
No Drawing. Continuation of abandoned application Ser. No. 40,701, May 26, 1970. This application Mar. 30, 1973, Ser. No. 346,438
Claims priority, application Switzerland, May 28, 1969, 8,077/69
Int. Cl. C07d 51/38
U.S. Cl. 260—260
2 Claims

ABSTRACT OF THE DISCLOSURE

Low temperature process for the production of orotic acid from diketene by initial reaction with chlorine to form the gamma-chloroacetoacetic acid chloride followed by reaction with urea to from 4-chloromethyl uracil and oxidation with alkaline hydrogen peroxide.

---

This application is a continuation of application Ser. No. 40,701, filed on May 26, 1970 and now abandoned.

BACKGROUND OF INVENTION

Orotic acid is a known compound utilized in the manufacture of vitamin $B_{12}$. It is also used itself as a therapeutic agent in the maintenance of proper liver function, and as a useful additive to animal feeds.

It has been prepared by chlorination of deketene at temperatures of from $-5°$ C. to $+20°$ C. to produce, initially the gamma-chloroacetoacetic acid chloride, followed by reaction with urea in a pyridine-glacial acetic acid mixture at about 20° C. to form 4-chloromethyl uracil. The latter compound was then reacted with alkaline hydrogen peroxide whereby it was oxidized to the desired orotic acid. The oxidation was an exothermic reaction and was initiated at room temperature and completed at a temperature of about 50° C. The overall yield, based diketene employed was only 22%.

A process has now been discovered by the practice of which it has been found possible to substantially double the over-all yield.

THE INVENTION

In accordance with the process of the invention the desired result is achieved by a three step process.

In the first step deketene is chlorinated by reaction with chlorine at a low temperature in the range of from about $-10°$ C. to $-30°$ C. to form the gamma-chloroacetoacetic acid chloride. At least enough chlorine should be employed to assure as complete a reaction as possible of the diketene. Ordinarily an excess will be utilized and reaction will be continued until it is substantially complete.

After formation of the gamma-chloroacetoacetic acid chloride, and without isolation thereof, reaction is continued in the same reaction medium. In the second step of the process urea dissolved in an amine-lower aliphatic acid such as pyridine-glacial acetic acid is added to the reaction mixture at such a rate that substantially all of the urea reacts is it is added and no large excess of urea accumulates. The temperature is maintained in the same range disclosed above. The product formed is 4-chloromethyl uracil which is isolated in the usual way.

The overall time of reaction for the first two steps of the process is from about 12 to 18 hours, and it will, of course, vary with the selected temperature. In any event, reaction is continued until excess urea accumulates in the reaction mixture indicating that substantially all of the gamma-chloroacetoacetic acid chloride has reacted.

As indicated above, the temperature range at which the first two steps are carried out is from about $-10°$ C. to $-30°$ C. The most practical range commensurate with reasonable yields and reaction times is from $-15°$ C. to $-25°$ C. Temperatures above $-10°$ C. tend to decrease the yields of desired product due to an increased degree of chlorination of the acetoacetic acid chloride. At temperatures below $-30°$ C. the process, while still operative, tends to be too slow to be of practical interest.

The solvents employed in the first two steps of the process are reaction inert, low boiling, organic liquids, typically halogenated hydrocarbons, especially chlorinated hydrocarbons such as dichloroethane, dichloropropane, carbon tetrachloride, and the like, containing up to about four carbon atoms. Solvent mixtures may be employed, if desired.

The 4-chloromethyl uracil is separated after the second step, suitably after permitting the temperature of the reaction mixture to reach about $-10°$ C. to 0° C. It is preferably dried and then added to an alkaline hydrogen peroxide mixture for oxidation to the metallic salt orotic acid. Since sodium hydroxide is the usual alkaline reagent, the salt formed is the sodium salt. A sufficient quantity of alkaline reagent is added to the hydrogen peroxide to permit the formation of as much salt as possible. The concentration of hydrogen peroxide is of the same order of magnitude utilized in the prior procedure. Suitably it will vary from about 30% to 40%.

Whereas, in the prior art process oxidation was effected starting at room temperature and allowed to continue to completion at about 50° C., in the process of this invention the oxidation is substantially all carried out at about 50° C. to 60° C. In fact, it has been found convenient to preheat the oxidation medium to about 50° C. to 60° C. before starting reaction.

At the end of the reaction period the orotic acid is formed by neutralization, suitably by the addition of mineral acid.

The results obtained by the process of this invention are most surprising. Despite the low temperature employed and the other variations from the conventional process, the overall yield is increased by as much as 100%, and the purity is more than 99%. Moreover, despite the low temperature employed, the reaction takes place within a time period which is acceptable for industrial processes.

The following non-limiting example is given by way of illustration only

EXAMPLE

A mixture of 5000 ml. of carbon tetrachloride and 840 g. of diketene was cooled to $-20°$ C. and 710 g. chlorine gas was added while this temperature was maintained. Subsequently, with the temperature still maintained at $-20°$ C., a solution of 600 g. urea in 4000 ml. glacial acetic acid and 820 g. pyridine was added. The reaction was continued with stirring until it was completed (approximately 16 hours). The 4-chloromethyl uracil was isolated at $-5°$ C. by filtration of the obtained precipitate which was subsequently washed and dried. This dried product was oxidized in batches, by adding batches of 80 g. of 4-chloromethyl uracil to a solution of 120 g. of sodium hydroxide in 1000 ml. water and 200 ml. 35% hydrogen peroxide, which had been preheated to 50 to 60° C. After stirring for 30 minutes at 50 to 60° C. the orotic acid was liberated from the formed Na-salt by acidizing with aqueous hydrochloric acid. The total yield, computed, based on the diketene, was 44% of the theoretical value.

What is claimed is:
1. A process for the production of orotic acid which comprises the steps of
   (a) reacting chlorine with diketene in a reaction inert organic solvent at a temperature of from about $-10°$ C. to $-30°$ C. to form the gamma-chloroacetoacetic acid chloride,

(b) adding a solution of urea in a pyridine-glacial acetic acid mixture to the resulting reaction mixture at a rate such that substantially all of the urea reacts as it is added while maintaining the temperature in the same range thereby to form 4-chloromethyl uracil,
(c) isolating the chloromethyl uracil and oxidizing it to an alkaline salt orotic acid by reaction at from about 50° C. to 60° C. with alkaline hydrogen peroxide, and thereafter neutralizing to form the acid.

2. A process as in claim 1 wherein the temperature in steps (a) and (b) is maintained at from −15° C. to −25° C.

References Cited

Rambacher, P. et al.: Preparation of Orotic Acid From 4-chloromethyl uracil, Angew. Chem. Internat. Edit., Vol. 7, (1968) No. 5, page 383.

DONALD G. DAUS, Primary Examiner

ANNE MARIE T. TIGHE, Assistant Examiner